US012465084B2

(12) United States Patent
Reevell et al.

(10) Patent No.: US 12,465,084 B2
(45) Date of Patent: Nov. 11, 2025

(54) THIN FILM HEATER

(71) Applicant: JT International SA, Geneva (CH)

(72) Inventors: Tony Reevell, London (GB); Eduardo Jose Garcia Garcia, Grand-Saconnex (CH)

(73) Assignee: JT International SA (CH)

( * ) Notice: Subject to any disclaimer, the term of this patent is extended or adjusted under 35 U.S.C. 154(b) by 733 days.

(21) Appl. No.: 17/640,155

(22) PCT Filed: Aug. 28, 2020

(86) PCT No.: PCT/EP2020/074146
§ 371 (c)(1),
(2) Date: Mar. 3, 2022

(87) PCT Pub. No.: WO2021/043689
PCT Pub. Date: Mar. 11, 2021

(65) Prior Publication Data

US 2022/0312843 A1 Oct. 6, 2022

(30) Foreign Application Priority Data

Sep. 6, 2019 (EP) .................................... 19196021

(51) Int. Cl.
*A24F 40/46* (2020.01)
*A24F 40/57* (2020.01)
*H05B 3/36* (2006.01)

(52) U.S. Cl.
CPC .............. *A24F 40/46* (2020.01); *A24F 40/57* (2020.01); *H05B 3/36* (2013.01); *H05B 2203/013* (2013.01)

(58) Field of Classification Search
None
See application file for complete search history.

(56) References Cited

U.S. PATENT DOCUMENTS 4,532,164 A 7/1985 Claunch, II et al.
4,719,335 A 1/1988 Batliwalla et al.
(Continued)

FOREIGN PATENT DOCUMENTS

CN 203986080 U 12/2014
CN 105792686 A 7/2016
(Continued)

OTHER PUBLICATIONS

Aiche Neoprene thermal conductivity: https://www.aiche.org/conferences/aiche-annual-meeting/2018/proceeding/paper/197h-noble-gas-infused-neoprene-closed-cell-foams-ultra-low-thermal-conductivity-textiles#:~:text=We%20focus%20on% 20neoprene%20foam,0.050%2D0.060%20W%2Fm%2DK. (retreived Jul. 26, 2024) (Year: 2024).*

(Continued)

*Primary Examiner* — Michael H. Wilson
*Assistant Examiner* — Michael T Fulton
(74) *Attorney, Agent, or Firm* — Lerner David LLP

(57) ABSTRACT

A thin film heater includes a flexible heating element and a flexible electrically insulating backing film supporting the heating element; wherein the backing film includes one or both of a fluoropolymer or Polyetheretherketone. By using a fluoropolymer or Polyetheretherketone, improved dielectric and mechanical properties are provided, which are particularly suited to application in an aerosol generating device. A method of fabricating a thin film heater is also provided.

4 Claims, 7 Drawing Sheets

(56) References Cited

U.S. PATENT DOCUMENTS

| | | | | |
|---|---|---|---|---|
| 5,286,952 | A | 2/1994 | McMills et al. | |
| 5,408,574 | A * | 4/1995 | Deevi | A24F 40/46 392/404 |
| 9,943,114 | B2 | 4/2018 | Batista | |
| 2007/0007266 | A1 | 1/2007 | Sasaki et al. | |
| 2013/0042865 | A1 | 2/2013 | Monsees et al. | |
| 2015/0128969 | A1 | 5/2015 | Chapman et al. | |
| 2015/0181936 | A1 | 7/2015 | Lyubomirskiy et al. | |
| 2017/0042243 | A1 | 2/2017 | Plojoux et al. | |
| 2017/0164657 | A1 | 6/2017 | Batista | |
| 2018/0007741 | A1* | 1/2018 | Metz | H05B 6/362 |
| 2018/0027612 | A1* | 1/2018 | Roberts | H05B 3/146 219/541 |
| 2018/0045211 | A1 | 2/2018 | Okabe et al. | |

FOREIGN PATENT DOCUMENTS

| | | | | |
|---|---|---|---|---|
| CN | 106132218 | A | 11/2016 | |
| CN | 106455708 | A | 2/2017 | |
| CN | 205947109 | U | 2/2017 | |
| CN | 106659247 | A | 5/2017 | |
| CN | 107231790 | A | 10/2017 | |
| CN | 107531012 | A | 1/2018 | |
| CN | 107594622 | A | 1/2018 | |
| CN | 108013512 | A | 5/2018 | |
| CN | 108576948 | A | 9/2018 | |
| CN | 108851239 | A | 11/2018 | |
| CN | 108887756 | A | 11/2018 | |
| CN | 208144421 | U | 11/2018 | |
| CN | 109007989 | A | 12/2018 | |
| CN | 208370942 | U | 1/2019 | |
| CN | 208987201 | U | 6/2019 | |
| CN | 110173885 | A | 8/2019 | |
| DE | 202017000997 | U1 | 5/2018 | |
| DE | 102017003979 | A1 | 8/2018 | |
| EP | 0008912 | A1 | 3/1980 | |
| EP | 0128664 | A1 | 12/1984 | |
| EP | 0136861 | A1 | 4/1985 | |
| JP | S54150485 | A | 11/1979 | |
| JP | S60099634 | A | 6/1985 | |
| JP | H09245944 | A | 9/1997 | |
| JP | 2000023653 | A | 1/2000 | |
| JP | 2004186072 | A | 7/2004 | |
| JP | 2014524313 | A | 9/2014 | |
| JP | 2016110757 | A | 6/2016 | |
| JP | 2017520263 | A | 7/2017 | |
| JP | 2021516968 | A | 7/2021 | |
| KR | 101600787 | B1 | 3/2016 | |
| TW | 201704015 | A | 2/2017 | |
| WO | 2005068282 | A1 | 7/2005 | |
| WO | 2015035510 | A1 | 3/2015 | |
| WO | 2015172224 | A1 | 11/2015 | |
| WO | 2016005533 | A1 | 1/2016 | |
| WO | 2016160749 | A1 | 10/2016 | |
| WO | WO-2017114760 | A1 * | 7/2017 | A24D 1/10 |
| WO | 2019171331 | A2 | 9/2019 | |
| WO | 2020074611 | A1 | 4/2020 | |

OTHER PUBLICATIONS

Matweb FEP thermal conductivity: https://www.matweb.com/search/datasheet.aspx?matguid=c782af4519d949349d7c771ff6953314&n=1&ckck=1 (retrieved Jul. 26, 2024) (Year: 2024).*

Search Report dated Nov. 30, 2023 from the Office Action for Chinese Application No. 202080062240.8 issued Dec. 14, 2023, 2 pages.

Search Report dated Dec. 26, 2023 from the Office Action for Chinese Application No. 202080062239.5 Issued Jan. 4, 2024, pp. 1-2.

International Search Report for PCT/EP2020/074151 dated Nov. 10, 2020. 4 pgs.

International Search Report for PCT/EP2020/074146 dated Oct. 30, 2020. 5 pgs.

Search Report dated Jun. 18, 2024 from the Office Action for Chinese Application No. 202080062240.8 issued Jun. 21, 2024, 2 pages.

* cited by examiner

THIN FILM HEATER

CROSS-REFERENCE TO RELATED APPLICATIONS

The present application is a national phase entry under 35 U.S.C. § 371 of International Application No. PCT/EP2020/074146, filed Aug. 28, 2020, published in English, which claims priority to European Application No. 19196021.0 filed Sep. 6, 2019, the disclosures of which are incorporated herein by reference.

TECHNICAL FIELD

The present invention relates to a thin film heater and a method for fabricating a thin film heater

BACKGROUND

Thin film heaters are used for a wide range of applications which generally require a flexible, low profile heater which can conform to a surface or object to be heated. One such application is within the field of aerosol generating devices such as reduced risk nicotine delivery products, including e-cigarettes and tobacco vapour products. Such devices heat an aerosol generating substance within a heating chamber to produce a vapour and as such may employ a thin film heater which conforms to a surface of the heating chamber to ensure efficient heating of an aerosol-generating substance within the chamber.

Thin film heaters generally comprise a resistance heating element enclosed in a sealed envelope of flexible dielectric thin film, with contact points to the heating element for connection to a power source, the contact points usually soldered on to exposed parts of the heating element.

Such thin film heaters are generally manufactured by depositing a layer of metal onto the dielectric thin film support, etching the metal layer supported on the thin film into the required shape of the heating element, applying a second layer of dielectric thin film onto the etched heating element and heat pressing to seal the heating element with the dielectric thin film envelope. The dielectric thin film is then die cut to create openings for contacts which are soldered on to the portions of the heating element exposed by the openings. Sheets of polyimide thin film with a silicon adhesive layer are readily available and are often used to form the dielectric envelope.

The etching of the metal layer is generally achieved by screen printing a resist onto the surface of the metal foil, applying a resistance pattern, which may be designed in CAD, and transferring to the foil by selectively exposing the resist and then spraying the exposed surface of the metal layer with appropriate etch chemicals to preferentially etch the metal layer to leave the desired heating element pattern supported on the polyimide film.

Such conventional thin film heaters suffer from a number of disadvantages. In particular, exiting materials used for the dielectric layer, such as polyimide, do not have optimal dielectric and mechanical properties, meaning that thicker dielectric layers are required. This results in an increased thermal mass and accordingly sub-optimal heat transfer to a heating chamber. Furthermore polyimide is relatively expensive, increasing the manufacturing costs of devices incorporating a thin film polyimide heater. There also exists a need to identify alternative materials to polyimide to increase flexibility in manufacturing thin film devices and provide increased options in the selection of materials.

The present invention aims to make progress in addressing these issues to provide an improved thin film heater using and method for manufacturing a thin film heater.

SUMMARY OF THE INVENTION

According to a first aspect of the invention, there is provided a thin film heater for wrapping around a heating chamber of an aerosol generating device, the thin film heater comprising: a flexible heating element; a flexible electrically insulating backing film supporting the heating element; wherein the backing film comprises one or both of a fluoropolymer or Polyetheretherketone.

Fluoropolymers and or Polyetheretherketone (PEEK) provide a low cost alternative to polyimide-based thin film heaters while providing improved dielectric properties and good mechanical properties over a wide temperature range and therefore may be employed in thin film heaters. Therefore the present invention provides an alternative to polyimide thin film heaters with improved properties.

Preferably the backing film comprises one or more of Polytetrafluoroethylene (PTFE), Perfluoroalkoxy Polymer (PFA), Fluorinated ethylene propylene (FEP), Ethylene tetrafluoroethylene (ETFE), Polychlorotrifluoroethylene (PCTFE or PTFCE) and Polyetheretherketone. Such materials have appropriate properties over a wide temperature range to allow for application in a thin film heater. In particular each of these materials have high melting points such that they maintain their mechanical properties at elevated temperatures, allowing them to be used as an insulating support to the heating element. The specific melting points of these materials vary, dictating the maximum heating temperature that can be used when applied in a thin film heater and accordingly also the specific applications to which they can be used. However all are suited to application in a controlled temperature aerosol generating devices (or a "heat-not-burn" device) at certain temperature ranges.

Fluoropolymers have a number of further properties which makes them particularly suited to application in flexible heating films and provide a number of advantages over conventional materials used in such device. For example, fluoropolymers, and particularly PTFE, are very soft compared to polyimide, allowing them to be stretched and compressed which can allow them to mould around a heating element when used as sealing layers. This property also allows them to conform more closely to the surface of an object to be heated such as a heating chamber, allow improved heat transfer. Fluoropolymers have much lower surface friction (unless surface treated) which can be advantageous when employed in a multiple layer heater assembly where sliding of the layers can provide better heater compression and formation. Fluoropolymers, and particularly PTFE, are more resistance to tearing which is beneficial in the assembly process have means that thin film heaters based on these materials have a reduced risk of damage.

Preferably the thin film heater is a thin film heater for an aerosol generating device. Fluoropolymers and Polyetheretherketone provide appropriate temperature characteristics such that they can be employed in a thin film heater used in an aerosol generating device, for example to heat a heating chamber.

Preferably the thin film heater is configured such that it can conform to the outer surface of a tubular heating chamber, i.e. the thin film heater is sufficiently flexible to allow it to be wrapped into a closed loop. Preferably the thin film heater is configured to allow it to be wrapped into a tubular configuration, for example a cylindrical configuration. In this way it can be attached to the outer surface of a heating chamber of an aerosol generating device to provide efficient thermal transfer to the heating chamber.

Preferably the thin film heater is a thin film heater for a heat-not-burn aerosol generating device. Such devices heat a substance at a controlled temperature to release a vapour without burning the material, and therefore restrict the maximum heating temperature. The melting points of fluoropolymers and Polyetheretherketone, and accordingly their corresponding working temperature range, mean they are well suited for use in a controlled temperature aerosol generating device (or a "heat-not-burn" device).

Preferably the flexible electrically insulating backing film comprises one or more of Polytetrafluoroethylene (PTFE), Perfluoroalkoxy Polymer (PFA), Fluorinated ethylene propylene (FEP), Ethylene tetrafluoroethylene (ETFE), Polychlorotrifluoroethylene (PCTFE or PTFCE). Such fluoropolymers have favourable electrical insulating and mechanical properties over wide temperature ranges. PTFE is particularly preferably as it has a dielectric constant of 2.1 and a volume resistivity typically above $10^{18}$ ohm·cm. PTFE also has good mechanical properties over a wide temperature range and, with a melting point of 327° C., can be used for a wide range of heater applications. The improved electric insulation properties of such materials over commonly used dielectric thin films improve the insulation of the heating element, further enhancing the performance of the thin film heater.

Preferably the flexible electrically insulating backing film comprises Polyetheretherketone (PEEK). PEEK provides a further preferable option as it has a dielectric constant of 3.2 and volume resistivity above $10^{16}$ Ohm·cm, thus providing good electrical insulation properties.

Where the flexible electrically insulating backing film comprises a fluoropolymer, preferably one side of the flexible electrically insulating backing film comprises an at least partially defluorinated surface layer. The defluorinated surface layer is preferably provided by etching one surface of the fluoropolymer backing film. The backing film may be etched using one or both of plasma etching or chemical etching. Plasma etching may be applied using Ar, CF4, CO2, H2, H2O, He, N2, Ne, NH3, and O2 or mixed gases such as Ar+O2, He+H2O, He+O2, and N2+H2. Chemical etching may include the use of sodium containing solutions such as sodium ammonia. Fluoropolymers generally have an extremely low coefficient of friction and are chemically inert, meaning the fluoropolymer film must be treated in order to allow the film to adhere to a surface. By treating the film to provide a defluorinated surface layer, the surface may be functionalised such that it can be bonded to another surface. In this way the flexible heating element and possibly further thin film layers can be attached to the defluorinated surface of the fluoropolymer film.

Preferably the defluorinated surface layer is provided by sodium ammonia etching which provides a low cost method to create a bondable surface both quickly and efficiently, using a mixture of sodium and ammonia.

Preferably an adhesive layer is provided on the surface of the backing film to hold the flexible heating element.

The thin film may thus comprise an adhesive layer provided on the surface of the PEEK backing film in contact with the heating element.

For a fluoropolymer layer, the adhesive layer is provided on the etched surface layer, wherein the adhesive is preferably a silicon adhesive. Preferably the heating element is supported on the defluorinated surface of the backing film and attached to the defluorinated surface layer with the adhesive. In this way the heater may be reliably secured to the etched surface of the electrically insulating backing film in a low cost and straightforward method. In some examples of the invention, the heating element may be attached by subsequent heating of the flexible electrically insulating backing film, adhesive layer and positioned heating element to bond the heating element to the surface using the adhesive.

The thin film heater preferably further comprises a second flexible electrically insulating film which opposes the flexible electrically insulating backing film to at least partially enclose the heating element between the flexible electrically insulating backing film and the second flexible electrically insulating film. In this way, the heating element may be insulated within a dielectric envelope to allow the heating element to be applied in a device. Preferably the thin film heater comprises two contact points to allow the connection of a power source to the heating element, for example contact points may be soldered to exposed portions of the heating element through one of the electrically insulating films.

In one mode, the second flexible film overlaps with the first flexible film and extends beyond the first flexible film in the wrapping direction.

Preferably the flexible heating element is a planar heating element comprising a heater track which follows a circuitous path covering a heating area within the plane of the heating element; and two extended contact legs for connection to a power source. The contact legs may be sufficiently long to allow direct connection to a power source when the thin film heater is employed in the device. For example the length of the contact legs may be substantially equal or greater than one or both of the dimensions defining the heating area. The circuitous path may be configured to leave a vacant region within the heating area. The thin film heater may further comprise a temperature sensor positioned in the vacant region or in contact with the heating element. Preferably the thin film heater comprises a second flexible electrically insulating film which opposes the flexible electrically insulating backing film to enclose the heater track between the flexible electrically insulating backing film and the second flexible electrically insulating film. Preferably the heater track is enclosed between the backing film and the second flexible film layer while leaving the contact legs exposed to allow connection to a power source. This also allows for extending portions of the second flexible film to be used to attach the heating element and supporting backing film to a surface. It further may allow for aligning of the heating element relative to a heating chamber by using one of the extending portions, where these portions extend by a predetermined distance beyond the heating element.

Preferably the second flexible film is attached directly against the heating element. In this way, the heating element is sealed directly between the flexible dielectric backing film and the second flexible film such that an additional sealing layer is not required. In other words the heat shrink provides both a sealing layer and means of attachment.

Preferably the second flexible film is attached using an adhesive provided on the surface of the flexible dielectric layer which supports the heating element. The adhesive may be for example a silicon adhesive. The adhesive provides a straightforward means of reliably securing the heating element to the backing film. The flexible dielectric backing film may comprise a layer of adhesive, for example it may be polyimide film with a layer of Si adhesive. The heating element may be attached by subsequent heating of the flexible dielectric backing film, adhesive layer and positioned heating element to bond the heating element to the surface using the adhesive. The subsequent heating may be a heating step used to shrink a heat shrink film to attach the thin film heater to a heating chamber.

The second flexible film may overlap with the first flexible film and preferably extend beyond the first flexible film a the wrapping direction. As a result, the thin film heater can be wrapped with high efficiency and high electrical insulation on the heating chamber.

Preferably, the second flexible film is at least approximately twice the length of the first flexible film in a wrapping direction. As a result, the thickness of the second flexible can be maintained sufficiently low thus facilitating the wrapping operation while guaranteeing high dielectric strength and mechanical properties.

Preferably the second flexible film comprises an alignment region which extends beyond the heating element by a predetermined distance in a direction opposite to the direction of the extending contact legs of the heater, i.e. in a direction perpendicular to the wrapping direction, i.e. along a length direction of a tubular heating chamber to which the thin film heater is to be attached. In particular the second flexible film extends beyond a top edge of the heating element. In particular in an upward direction, i.e. a direction corresponding to towards the top, open end of the heating chamber when attached. By providing an alignment region which extends beyond the heating element and/or backing film by a chosen distance, the alignment region can be used to position the heating area of the heater at the required position. For example the method may further comprise aligning a top, marginal edge of the alignment region with an end of the heating chamber and attaching the thin film heater to the chamber using the second flexible film. In this way, the heating area is positioned at a known location along the length of the heating chamber from the end of the chamber, without having to carefully measure or adjust the heating element to align it correctly. Preferably the predetermined distance is measured from the side of the heating area opposite the contact legs to the peripheral edge of the alignment region.

Preferably the second flexible film comprises an attachment region which extends beyond the flexible backing film. Preferably the attachment region extends beyond the backing film in the wrapping direction, i.e. a direction approximately perpendicular to the direction of the extending contact legs. In particular, the second flexible film may have a width such that it extends beyond the heating element and flexible dielectric backing film in one or both directions which are perpendicular to the direction of extension of the heater contact legs. This direction may be referred to as the wrapping direction and is a direction approximately perpendicular to an elongate axis of the heater chamber when the thin film heater is attached to the heater chamber. The attachment portion of the second flexible film is preferably arranged to extend around the heating chamber when attached to secure the heating element to the heating chamber Preferably the attachment region of the second flexible film may extend sufficiently such that it can circumferentially wrap around an outer surface of the heating chamber. For example, the attachment region may extend by a distance corresponding to at least the width of the heating area (i.e. the dimension perpendicular to that direction of extension of the contact legs).

The second flexible film may comprise a heat shrink material. By using a heat shrink material, the second flexible film can be used to attach the thin film heater to the surface of a heating chamber. More particularly the layer of attached heat shrink film may comprise an attachment region which extends beyond the flexible backing film in a wrapping direction wherein the attachment region can be wrapped around the external surface of a heating chamber to hold the thin film heater against the surface; the assembly may then be heated to shrink the heat shrink film securing the thin film heater to the surface of the heating chamber. The heat shrink film may be a tubular heat shrink film arranged to be sleeved over a heating chamber before being heated to shrink the tubular heat shrink film to the outer surface of a heating chamber.

In particular the heat shrink film may preferably comprise a heat shrink tape which preferentially shrinks in one direction, such as heat shrink polyimide tape or tube (for example 208x manufactured by Dunstone). The wrapping direction is preferably aligned with the preferential shrinking direction. Alternatively the heat shrink may comprise a heat shrink PTFE film or tube or a PEEK film or tube. When a heat shrink tube is used, the preferential shrink direction may be at least approximately aligned with the circumference of the heat shrink tube.

In other examples of the invention the second flexible film is not a heat shrink film but another electrically insulating film. For example the second flexible film may comprise a fluoropolymer such as PTFE, or PEEK. The second flexible film may be attached to the flexible backing film with the heating element in between. The flexible backing film and second flexible film may form a sealed envelope enclosing all or part of the heating element.

The thin film heater may further comprise a third flexible film, preferably a heat shrink film, positioned on the second flexible electrically insulating film so as to as to at least partially overlap the second flexible electrically insulating film. For example the backing film and the second flexible film may be positioned either side of the heating element with a third flexible film positioned on the second flexible film. In this way, the third flexible film, preferably a heat shrink film, is not in contact with the heating element.

In some examples the flexible electrically insulating backing film and the second flexible electrically insulating film may enclose a least a portion of the heating element and the heat shrink film may be positioned on the backing film or second film such that the heat shrink can be used to attach the thin film heater to a heating chamber. Both the backing film and second film may comprise a fluoropolymer such as PTFE, or PEEK and in some examples, the backing film and second film form a sealed electrically insulating envelope which encloses the heating element and a layer of heat shrink film is attached to the electrically insulating envelope allowing the thin film heater to be attached to a heating chamber via heat shrinking.

The thin film heater may comprise one or more sealing layers, the one or more sealing layers arranged around the flexible backing film and heating element to seal the flexible backing film and heating element. In this way the backing film may be sealed to prevent the release or one or more by-products should the temperature of the film exceed a temperature at which the material breaks down. In some examples, the sealing layer may be provided by a heat shrink layer. Sealing may be particularly useful where the flexible backing film is a fluoropolymer to prevent the release of fluorine should the temperature of the fluoropolymer film exceed a temperature at which fluorine is released.

In some examples, the layers of the thin film heater are configured to provide increased heat transfer from the heating element in one direction. For example the thickness and/or material properties of one or more of: the flexible electrically insulating backing film, the second flexible electrically insulating film and the one or more sealing layers are selected to provide an increased heat transfer in a direction corresponding to towards the heating chamber during use. For example the insulating backing film may have an increased thermal conductivity relative to the second flexible electrically insulating layer and/or a sealing layer. In this way the transfer of heat to the heating chamber is promoted and transfer of heat away from the heating chamber is reduced to mitigate heat loss. Preferably the side of the thin film heater arranged to contact the heating chamber is configured to have a higher thermal conductivity than the opposite, outer side. Preferably the sealing layer has a lower thermal conductivity than the backing film.

Preferably the flexible electrically insulating backing film has a thickness of less than 80 μm preferably less than 50 μm, and preferably a thickness of greater than 20 μm. In this way the fluoropolymer or PEEK film has a reduced thermal mass to allow efficient heat transfer to an object to be heated such as a heating chamber while remaining mechanically stable.

In a further aspect of the invention there is provided an aerosol generating device comprising: a thin film heater as defined in the claims; and a tubular heating chamber; wherein the thin film heater is attached to the outer surface of the heating chamber and arranged to supply heat to the heater chamber. In this way an aerosol generating device with improved properties is provided with a reduced manufacturing cost, compared to those using conventional thin film heaters. In particular the heater has improved dielectric properties and may have a reduced thickness and associated thermal mass to allow efficient heat transfer to the heating chamber.

Preferably the thin film heater comprises a heat shrink film which opposes the backing film to at least partially enclose the heating element between the flexible electrically insulating backing film and the heat shrink film; wherein the heat shrink film extends around the thin film heater and heating chamber to attach the flexible electrically insulating backing film of the thin film heater against the outer surface of the heating chamber. By using a heat shrink material, the second flexible film can be used to attach the thin film heater to the surface of a heating chamber. More particularly the layer of attached heat shrink film comprises an attachment region which extends beyond the flexible backing film in a wrapping direction wherein the attachment region can be wrapped around the external surface of a heating chamber to hold the thin film heater against the surface; the assembly may then be heated to shrink the heat shrink film securing the thin film heater to the surface of the heating chamber. Preferably the heat shrink film has a lower thermal conductivity than the flexible electrically insulating backing film.

In particular the heat shrink film may comprise heat shrink tape which preferentially shrinks in one direction, such as heat shrink polyimide tape (for example 208x manufactured by Dunstone). By wrapping a layer of preferential heat shrink tape around the thin film heater to secure it to the heating chamber with the direction of the preferential heat shrink aligned with the wrapping direction, upon heating, the heat shrink layer contracts to hold the thin film heater tightly against the heater chamber. The heat shrink film may comprise a heat shrink tube which is sleeved over the heating chamber and heated to contract the heat shrink tube to secure the thin film heater to the heating chamber.

Preferably the heating chamber comprises: a tubular side wall with a sealed end and an open end; wherein the device is arranged such that air flows into and out of the open end of the heating chamber such that air flow through the device is restricted to within the heating chamber. In this way there thin film heater does not come into contact with air entering the heating chamber such that, even if by-products were to be released by the fluoropolymer film if the heating temperature exceeded a maximum temperature, these cannot reach the air flow path into and out of the device. That is, the thin film heater is sealed within the device and separated from the air flow path.

Preferably the aerosol generating device further comprises an electrical power source connected to the heating element of the thin film heater; and control circuitry configured to control the supply of the electrical power from the electrical power source to the thin film heater; wherein the electrical power source and/or control circuitry are configured to limit the maximum temperature of the thin film heater to a predefined temperature value, where the predefined temperature value is preferably below the melting temperature of the electrically insulating backing film. In this way, the heating temperature is restricted to the workable range of the fluoropolymer or PEEK material. Preferably the predefined maximum temperature value is within the range 150° C. to 270° C.

For example, the maximum temperature value for a particular fluoropolymer may be as shown in the table below.

| Fluoropolymer | Approximate maximum heater temperature(° C.) |
|---|---|
| Polytetrafluoroethylene (PTFE) | 250-260 |
| Perfluoroalkoxy Polymer (PFA) | 230-240 |
| Fluorinated ethylene propylene (FEP), | 190-200 |
| Polychlorotrifluoroethylene (PCTFE or PTFCE). | 150-160 |
| Ethylene tetrafluoroethylene (ETFE), | 190-200 |
| Polyetheretherketone (PEEK) | 260-270 |

Preferably the aerosol generating device further comprises a sealing layer arranged around an outer surface of the thin film heater to seal the thin film heater between the sealing layer and the heating chamber; wherein the sealing layer has a lower thermal conductivity than the flexible electrically insulating backing film.

In a further aspect of the invention there is provided a method of manufacturing a thin film heater for an aerosol generating device, the method comprising: providing a flexible thin film backing layer comprising a fluoropolymer; etching one side of the backing layer to provide a defluorinated surface layer; applying an adhesive to the defluorinated surface layer; attaching a flexible heating element to the etched side of the backing layer using the adhesive.

BRIEF DESCRIPTION OF THE DRAWINGS

Embodiments of the invention will now be described, by way of example only, with reference to the accompanying drawings, in which.

DETAILED DESCRIPTION

Figure 1:
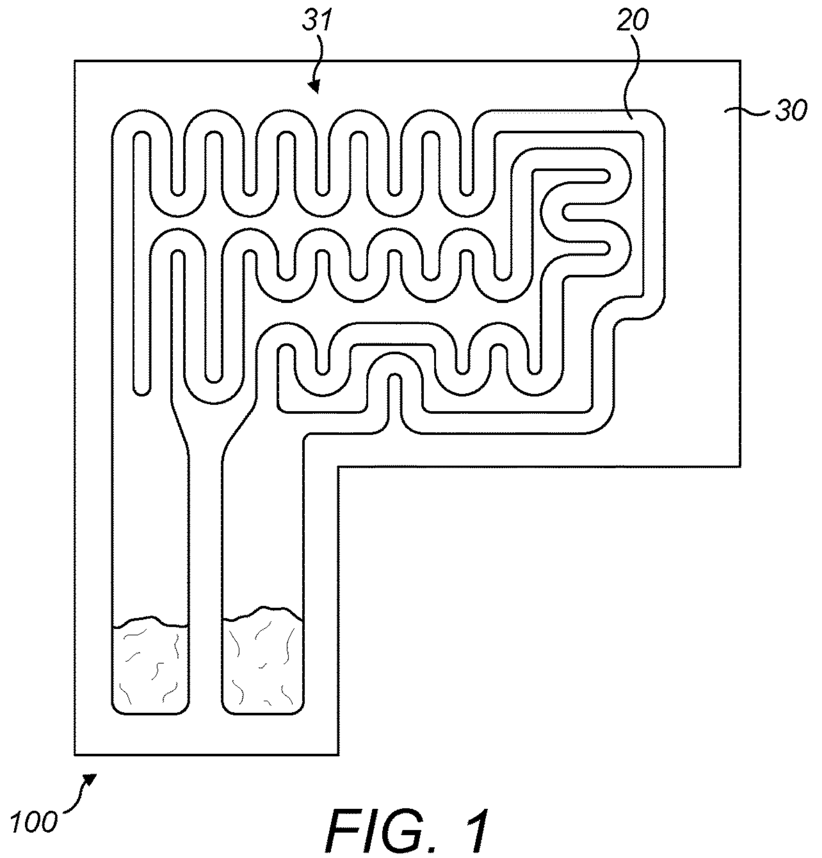
FIG. 1 illustrates a thin film heater according to the present invention.

FIG. 1 schematically illustrates a thin film 100 comprising a flexible heating element 20 and a flexible electrically insulating backing film 30 supporting the heating element 20, wherein the backing film 30 comprises a fluoropolymer or PEEK. Fluoropolymers and PEEK have a range of advantageous properties which are maintained over a wide working temperature range and therefore may be applied as a dielectric layer in a thin film heater 100. In particular, these materials have improved electrical insulation properties over conventional materials meaning the thickness of the film may be reduced to reduce the thermal mass and enhance the transfer of heat from the heating element to a structure to be heated, for example the heating chamber of an aerosol generating device.

Fluoropolymers and PEEK are materials which are characterised by a high resistance to solvents, acids and bases and have good dielectric properties, with their mechanical properties being maintained over a wide temperature range. Accordingly they can cope with the elevated temperatures required of a thin film heater, particularly those required when employed in an aerosol generating device wherein the heater is used to heat a heating chamber. Specific examples of fluoropolymers that can be employed in the flexible electrically insulating backing film of the thin film heater according to the present invention are provided in the table below, with their associated melting point and an approximate value for the maximum temperature to which the heater may be taken. The values for PEEK are also provided.

TABLE 1

| Fluoropolymer | Melting point (° C.) | Approximate maximum heater temperature |
|---|---|---|
| Polytetrafluoroethylene (PTFE) | 327 | 260 |
| Perfluoroalkoxy Polymer (PFA | 305 | 240 |
| Fluorinated ethylene propylene (FEP), | 260 | 200 |
| Polychlorotrifluoroethylene (PCTFE or PTFCE). | 220 | 160 |
| Ethylene tetrafluoroethylene (ETFE), | 265 | 200 |
| Polyetheretherketone (PEEK) | 345 | 260 |

These values mean that both PEEK and these examples of fluoropolymers can be used for a wide variety of applications. In particular, the materials can be employed in aerosol generating devices such as heat not burn devices which heat an aerosol generating substance, such as tobacco, to an elevated temperature at which the substance releases a vapour without exceeding a temperature at which the substance will burn. In this way, a vapour may be released for inhalation which does not contain the wide range of unwanted by-products of combustion which are known to be hazardous to the health. Such controlled heating devices generally have a maximum operating temperature of around 150 to 260° C. and, as can be seen from the values provided in the table above, these are ideal materials to provide the electrically insulating backing film in such thin film heaters for these applications.

The thin film heater 100 shown in FIG. 1 uses PTFE as the electrically insulating backing film which has particularly optimal properties given it has a high melting point of approximately 327° C. and therefore can be operated up to a maximum heating temperature of around 260° C. The optimal temperature for the release of vapour from tobacco is between 200 and 260° C. and therefore the above materials provide ideal candidates for such applications, with PTFE and PEEK in particular being capable of use up to the upper limit of this range, where vapour release is enhanced.

As shown in FIG. 1, a planar heating element 20 is provided on one surface 31 of the flexible electrically insulating backing film 30. The flexible heating element 20 may be etched from a layer of metal, for example, stainless steel, which is first deposited on the flexible backing film 30 or alternatively the heating element 20 may be etched from a free-standing metal sheet from both sides to provide an individual heating element 30 (or array of connected heating elements 30) which can then be subsequently attached to the backing film 30.

One property of fluoropolymers is that they have a very low coefficient friction and are not as susceptible to the Van der Waals force as most materials. This provides them with non-stick and friction reducing properties which are utilised in a wide range of applications but prevent a flexible heating element from being attached to the untreated surface in the thin film heater of the present invention. Therefore, one side of the flexible electrically insulating fluoropolymer backing film 30 is etched to provide a defluorinated surface layer. By treating the surface of the flexible electrically insulating backing film 30 in this way the surface is functionalised to allow the thin film heater to be attached, for example by the application of an adhesive (which will stick to the etched defluorinated surface layer but not an untreated surface of the fluoropolymer film). Etching of the surface of the fluoropolymer film may be carried out by a wide range of known processes, for example plasma or chemical etching. A particularly advantageous method is by chemical etching using sodium ammonia which creates a bondable surface layer both quickly and efficiently.

The chemical etching process causes a reaction between the fluorine molecules in the surface of the material and the sodium solution. The fluorine molecules are stripped away from the carbon backbone of the fluoropolymer, which leaves a deficiency of electrons around the carbon atom. Once exposed to air, hydrogen, oxygen molecules and water vapour restore the electrons around the carbon atom. This results in a group of organic molecules that allow adhesion to take place. An alternative is plasma treatment with hydrogen used for the process gas in a low pressure plasma. Hydrogen ions and radicals react with fluorine atoms to form Hydrofluoric acid and leave unsatturated carbon bindings which provide perfect links for organic molecules of coating substances.

After surface treatment to provide an at least partially defluorinated surface layer, an adhesive can be applied to the surface layer and the heating element 20 can be attached with the adhesive and will remain secured to the etched surface layer. The adhesive is preferably a silicon adhesive and the heating element may be applied to be silicon adhesive layer and later heated which bonds the heating element to the etched defluorinated surface layer.

Figure 2:
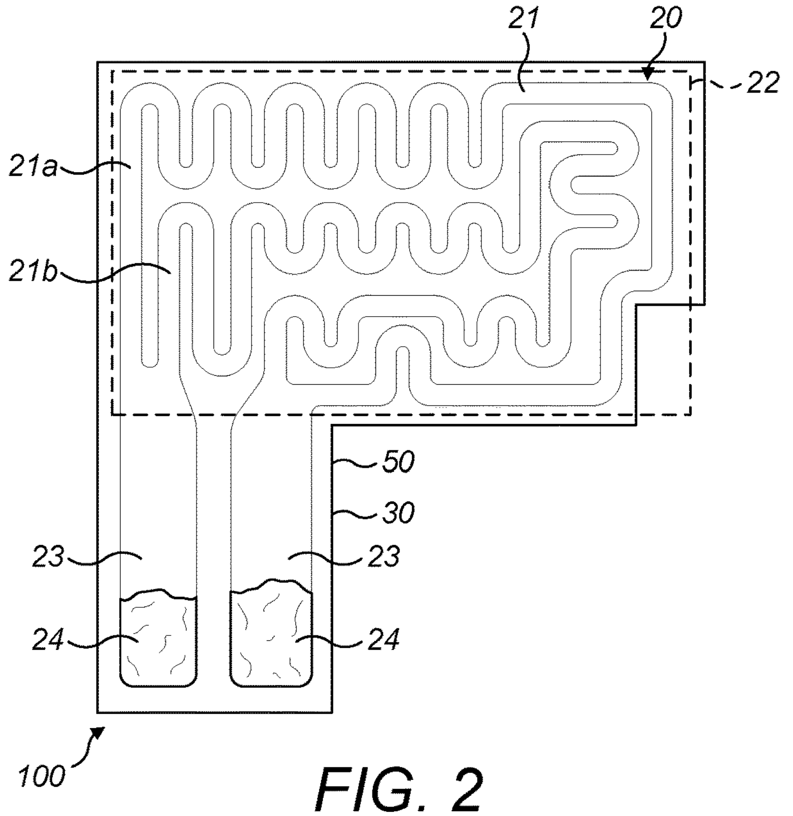
FIG. 2 illustrates a thin film heater according to the present invention including a second electrically insulating film forming a sealed envelope enclosing the heating element.

As shown in FIG. 2, the heater element 20 comprises a heater track 21 which follows a circuitous path to substantially cover a heating area 22 within the plane of the heating element 20, and two extended contact legs 23 for connecting the heating element 20 to a power source. The heating element 20 is a resistive heating element, i.e. it is configured such that when the contact legs 23 are connected to a power source and the current is passed through the heating element 20, the resistance in the heater track 21 causes the heating element 20 to heat up. The heater track 21 is preferably shaped so as to provide substantially uniform heating over the heating area 22. In particular, the heater track 21 is shaped so that it contains no sharp corners and has a uniform thickness and width with the gaps between neighbouring parts of the heating track 21 being substantially constant to minimise increased heating in specific areas over the heater area 22. The heater track 21 follows a winding path over the heater area 22 whilst complying with the above criteria. The heater track 21 in the example of FIG. 2 is split into two parallel heater track paths 21*a* and 21*b* which each follow a serpentine path over the heater area 22. The heater legs 23 may be soldered at connection points 24 to allow the connection of wires to attach the heater to the PCB and power source. Alternatively, the heating element may be fabricated to have extended contact legs which can be connected directly to a PCB or power source within a device.

As shown in FIG. 2 the heating element 20 is sealed between the flexible backing film 30 and a second flexible electrically insulating film 50 such that the heating element is sealed within an electrically insulating envelope. A portion of the legs 23 remain exposed at solder points 24 to allow for connection of the heating element to a power source. The sealing of the heating element 20 with a second flexible electrically insulating film 50 may be achieved in a number of different ways. In the example of FIG. 2, the second flexible electrically insulating film 50 is another layer of fluoropolymer or PEEK film, with the opposing sides of the corresponding films both etched to allow for the adhesion of the silicon adhesive and the heating element in-between. In particular the sealed heating element of FIG. 2 may be formed from two pieces of fluoropolymer backing film, each with a defluorinated surface (or two pieces of PEEK backing film or one fluoropolymer and one PEEK backing films) to which an adhesive is applied. The heating element 20 is then placed between the opposing films and they are heat sealed to form the sealed thin film heater 100 shown in FIG. 2. The thin film heater 100 of FIG. 2 may then be attached to the outer surface of a heating chamber 60 with further pieces of adhesive film in order to hold the heating area 22 of the heating element 20 against the outer surface of the heating chamber at an appropriate position along the length of the chamber at which heat is to be applied during use.

An alternative for the second flexible electrically insulating film 50 is shown in the attachment method of FIG. 3. Here the thin film heater 100 is not sealed within two layers of fluoropolymer or PEEK film and die cut to provide a heating element as shown in FIG. 2 but instead a piece of heat shrink film 50 provides the second electrically insulating film, which is applied directly to the surface of a thin film heater with an exposed heating element, as shown in FIG. 1. This reduces the number of layers of film between the heating element and a heating chamber to reduce the thermal mass and enhance the transfer of heat to the heating chamber.

FIG. 3 illustrates a method of attaching the thin film heater 100 of FIG. 1 to a heating chamber 60 using a heat shrink film 50, which allows for the thin film heater 100 to be tightly and securely attached to the outer surface of the heating chamber 60. Firstly, the second flexible film 50 is positioned so as to enclose the heating area 22 of the heating element between the backing film 30 and the heat shrink film 50, whilst leaving the heater legs 23 exposed for later connection to a power source. In this example, the heat shrink film 50 comprises heat shrink tape which preferentially shrinks in one direction, such as heat shrink polyimide tape (for example 208x manufactured by Dunstone) or even preferably a PEEK tape. By wrapping a layer of preferential heat shrink tape around the thin film heater 100 to secure it to the heating chamber, with the direction of the preferential heat shrink aligned with the wrapping direction, upon heating, the heat shrink layer contracts to hold the thin film heater 100 tightly against the heater chamber 60.

Figure 3A:
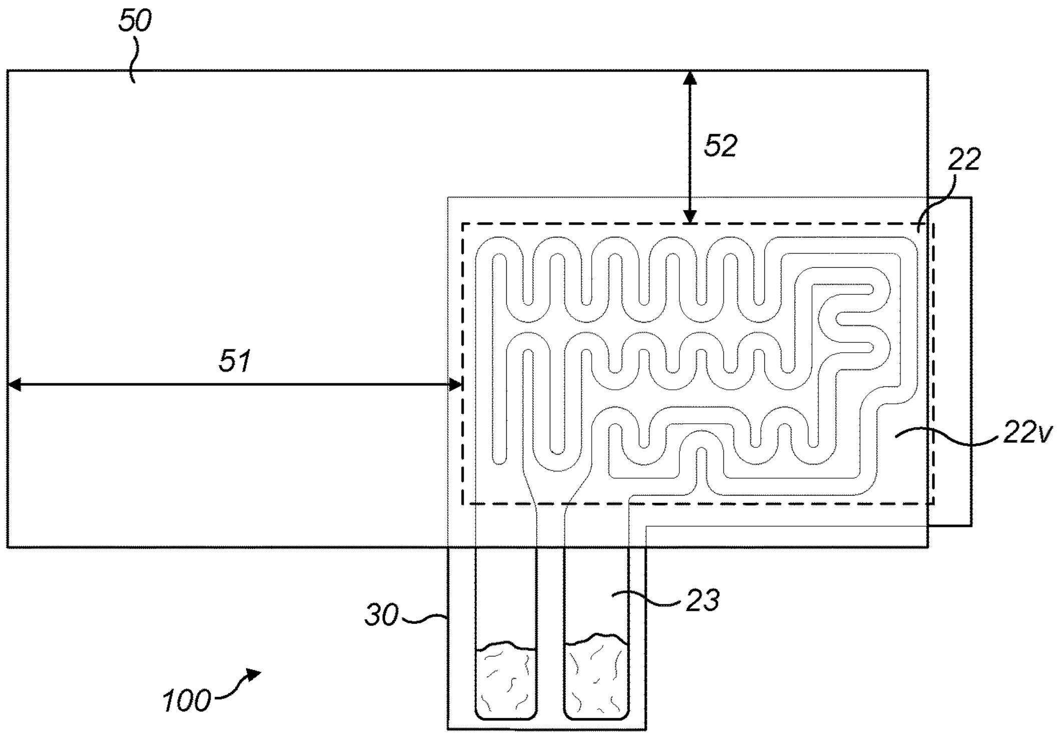
FIG. 3A to 3F illustrates the assembly of a heater assembly using the thin film heater according to the present invention.

The heat shrink film 50 is positioned over the heating area 22 of the heating element 20 on the surface of the thin film heater 100 as shown in FIG. 3A. The heat shrink 50 is sized and positioned so as to extend beyond the area of the flexible electrically insulating backing film 30 in direction 51 and 52 by a predetermined distance. Attachment portion 51 extends beyond the heating element in a direction corresponding to the direction in which the heater assembly 100 is wrapped around the heater cup 60 (and also the preferential shrink direction of the heat shrink film 50). In particular, the heat shrink film 50 extends beyond the backing film 30 and supported heater element 20 in a direction 51 approximately perpendicular to the direction in which the heating element contact legs 23 extend from the heating area 22. When wrapped around the heating chamber 60, the heating area is aligned appropriately to extend around the circumference of the heating chamber, while the extending attachment portion 51 of the heat shrink film 50 wraps a second time around the circumference of the chamber 60 to cover the heating area 22 and secure the thin film heater to the chamber 60.

The heat shrink film 50 preferably extends sufficiently in the wrapping direction 51 such that the attachment portion 51 extends around the circumference of the heating chamber when the thin film heater 100 is wrapped around the heating chamber 60. The adhesive on the fluoropolymer or PEEK backing film 30 can affect the contraction of the heat shrink film in areas in which the heat shrink film is in contact with the adhesive and therefore a sufficient extending region 51 which is free of the adhesive layer should be provided which can wrap around the heating chamber to ensure that heat shrink 50 contracts correctly during heating to securely attach the thin film heater 100 to the heating chamber 60.

The heat shrink film 50 also preferably extends upwardly (in a direction corresponding to the elongate axis of the heater chamber 60) beyond the heating element 20 and backing film 30 in a direction 52, opposite to the direction of extension of the heater contact legs, to form an alignment region 52. By measuring this distance in direction 52 from the heating element to the edge of the alignment region, the alignment region can be used as a reference to correctly place the heating area 22 at the correct position along the length of the heating chamber 60 as required. In particular, by aligning this top edge of the alignment region 52 of the heat shrink 50 to the top edge 62 of the heating chamber, the heating area 22 can be reliably positioned at the correct point along the length of the heating chamber 60 during assembly.

Figure 3B:
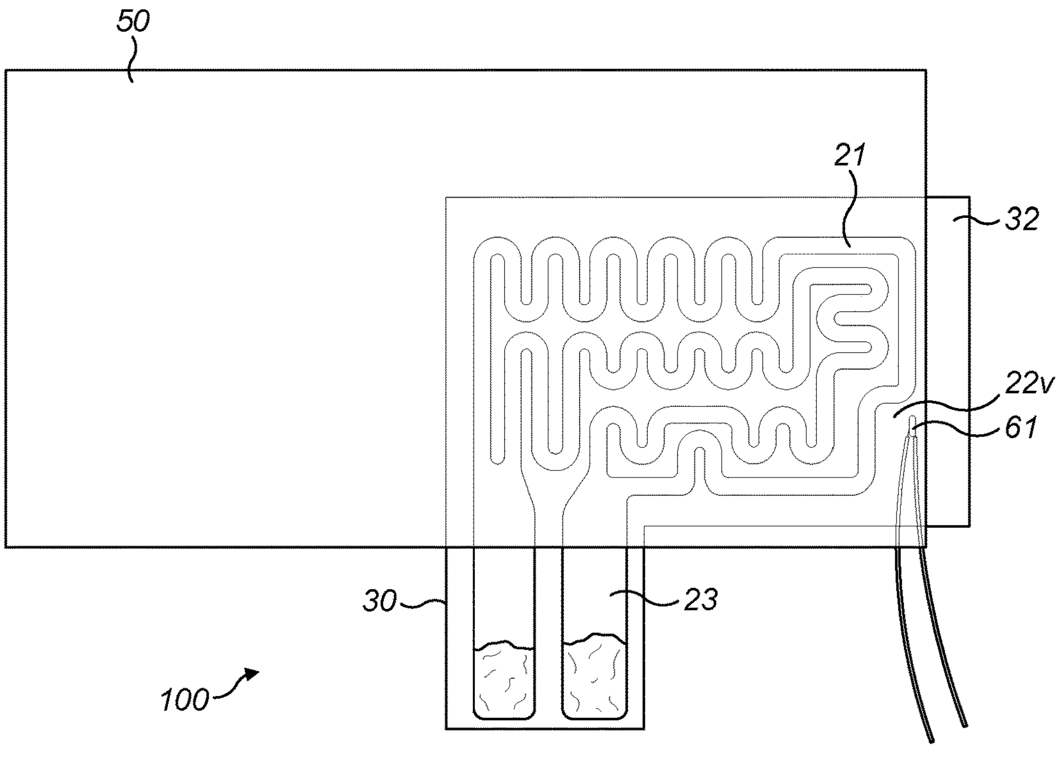

As shown in FIG. 3B, a thermistor 70 may be introduced between the fluoropolymer backing film 30 and the heat shrink layer 50. The thermistor 70 may be attached adjacent to the heater track 21 on the silicone adhesive layer of the backing film 30 or may be positioned on the surface of the heater track 21. The heater track 21 may be etched in a pattern such that the path followed by the heater track 21 leaves a vacant region 22*v* of the heater area 22. The thermistor 70 may be attached with the temperature sensing head positioned in this vacant area 22*v*, closely neighbouring the adjacent heater track 21. In this example of the assembly method, the heat shrink film 50 may be positioned so as to leave a free edge region 32 of the backing film 30 adjacent to the heating area 20. This free edge region 32 is positioned on the opposite side of the heater element 20 to the extended attachment portion 51 of the heat shrink material 50. This adhesive edge portion 32 may then be folded over to secure the heat shrink layer 50 and the enclosed thermistor 70 to the backing film 30.

Figure 3C:
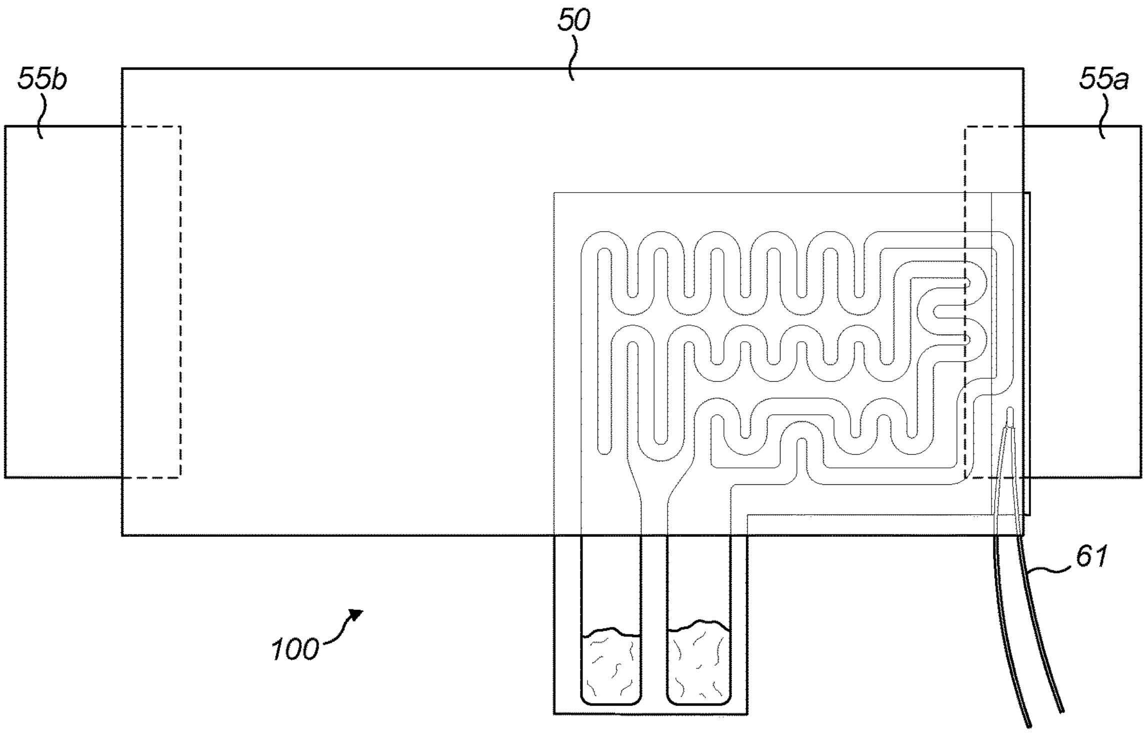
Figure 3D:
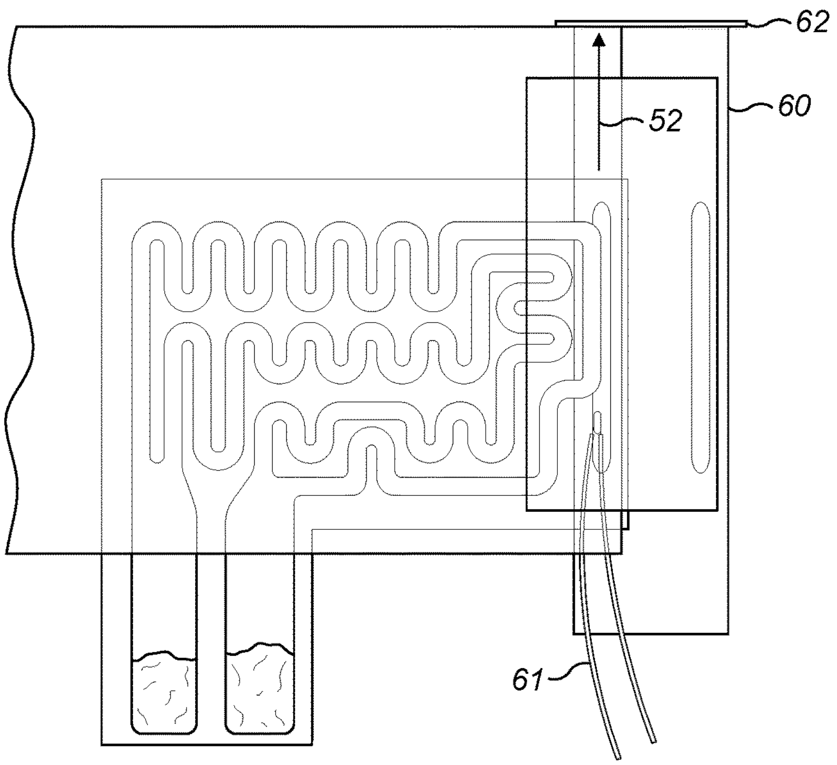

The attachment of the thin film heater assembly 100 to the outer surface of the heater chamber 60 may be achieved in a number of different ways. In the method illustrated in FIG. 3, pieces of adhesive tape 55*a*, 55*b* are attached to each side of the thin film heater assembly 100 (at each opposing peripheral edges of the heat shrink 50 in the wrapping direction), as shown in FIG. 3C. Then, as shown in FIG. 3D, the thin film heater assembly 100 is attached to the heating chamber 60 with a piece of adhesive tape 55*a* adjacent to thermistor 70, with the electrically insulating backing film 30 in contact with the outer surface of the heating chamber 60 and the heat shrink film 50 facing outwards. The heating area 20 is positioned by aligning the top side of the alignment region 52 of the electrically insulating film with a top edge of the heating chamber 60. The thermistor 70, held between the heat shrink 60 and backing film 30, may be aligned so that it falls within a recess 61 provided on the outer surface of the heating chamber 60. These elongate recesses 61 are provided around the circumference of the heating chamber 60 and protrude into the inner volume to enhance the heat transfer to a consumable inserted into the chamber 60 during use. By providing a thermistor 70 such that it lies within such a recess 61, a more accurate reading of the internal temperature of heating chamber 60 may be obtained.

Figure 3E:
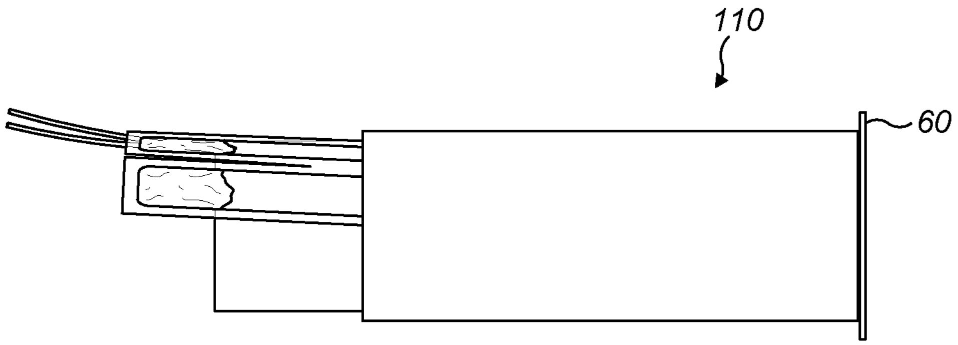
Figure 3F:
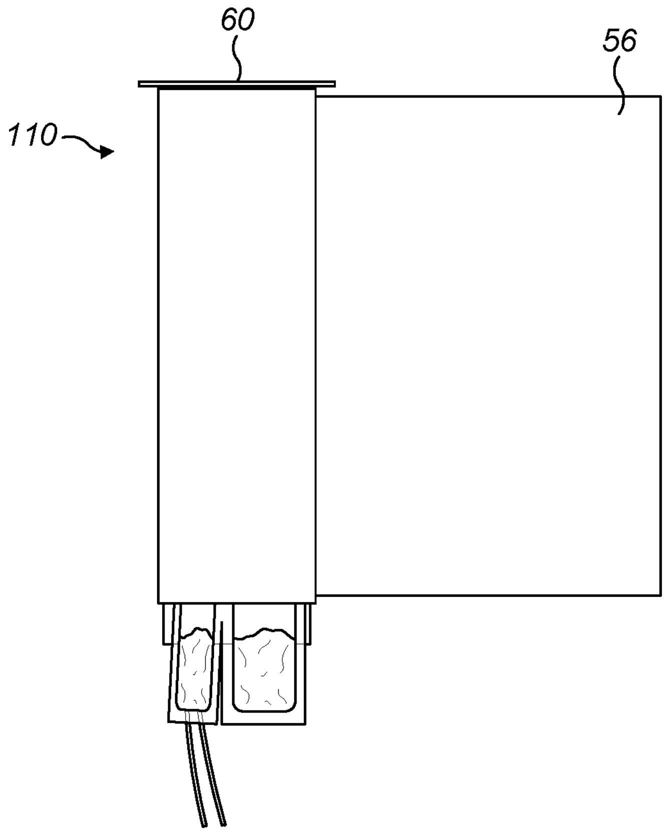

The thin film heater assembly 100 is then wrapped around the circumference of the heating chamber 60 so that the heating area 20 lies around the complete circumference of the heating chamber 60. The extending portion 51 of the heat shrink film 50 wraps around the heating chamber 60 so as to cover the heating element 20 with an additional layer on its outer surface. The extending wrapping portion 51 of the heat shrink material 50 is then attached using the second attached portion of adhesive tape 55*b*. The wrapped heater assembly 110 shown in FIG. 3E is then heated to heat shrink the thin film heater 100 to the outer surface of the heating chamber 60. Finally, an additional layer of thin film 56, for example a further fluoropolymer film or a PEEK film or a polyimide thin film 56 may be applied with the around the outer surface of the heater assembly 110. The additional layer of thin film 56 further secures the thin film heater assembly to the heating chamber to provide additional strength. It also may provide a number of additional benefits, such as sealing the backing film and providing improved insulation, as described below.

This additional film layer 56 may be a material other than a fluoropolymer, for example polyimide, and used to seal the fluoropolymer film against the heating chamber. Fluoropolymers may break down at certain elevated temperatures and release unwanted by-products of this breakdown process which should be sealed within the device to prevent them entering the generated vapour to be inhaled by a user. One or more sealing layers 56 may therefore be wrapped around the heater either before it is attached to a heating chamber, as shown in FIG. 1 and FIG. 2, or after attachment to a heating chamber to seal all fluoropolymer films within the sealing layers. It can be useful to select a material for the sealing layer which has a reduced thermal conductivity relative to the backing film so as to insulate the heater further and promote heat transfer from the heating element 20 to the chamber 60. Once the outer insulating layer 56 has been applied, the assembly 110 may again be heated. This second heating step allows for further outgassing of the outer layer of dielectric film 56, as well as the other layers. For example, in the second heating stage, the heating temperature may be taken up to a higher temperature than the heat shrinking stage, closer to the operating temperature of the device. This allows for further outgassing, for example of the Si adhesive, that may not have taken place during the heat shrinking step at the lower temperatures. It is also beneficial to expose the heat shrink to a temperature closer to the operating temperature prior to heating during first use of the device.

Figure 4A:
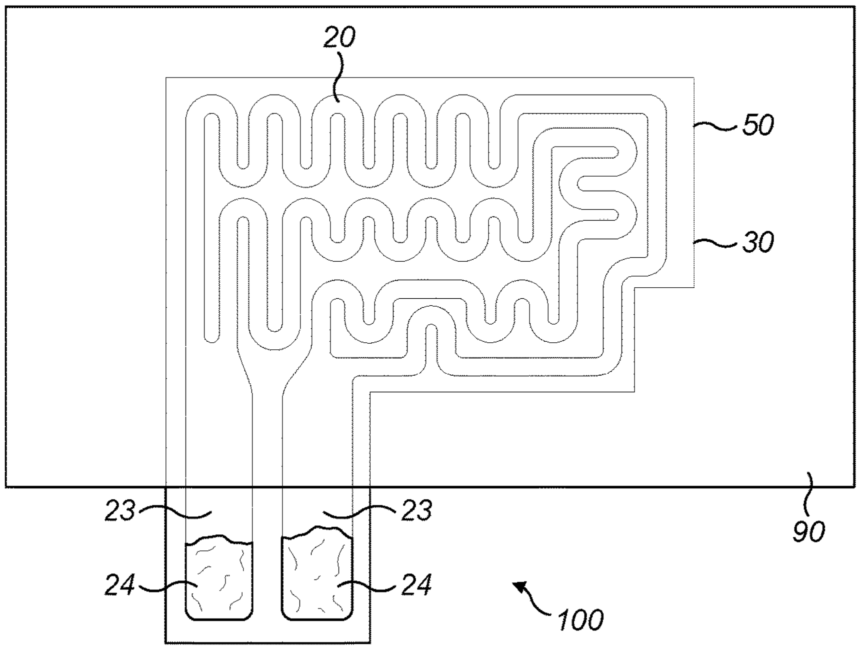
FIG. 4A to 4D illustrate thin film heaters according to the present invention which incorporate a second flexible film layer and an additional heat shrink layer.
Figure 4B:
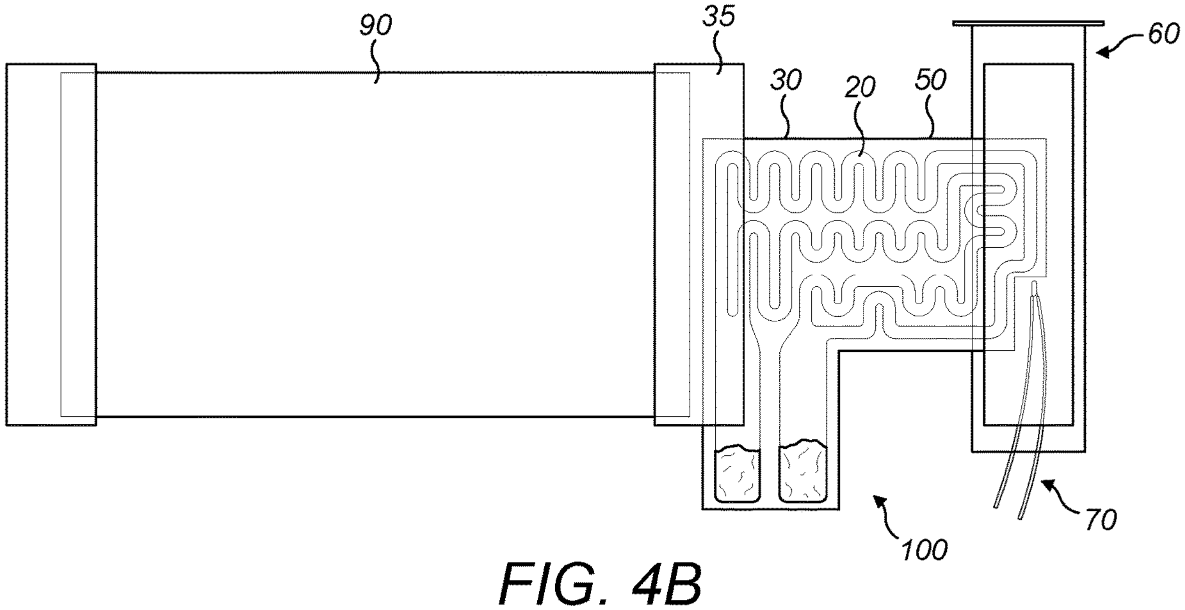

Further examples of the thin film heater 100 according to the present invention are illustrated in FIGS. 4A and 4B. In both of these examples the heating element 20 is enclosed between the flexible electrically insulating backing film 30 and the opposing second electrically insulating film 50. Both of these layers 30, 50 comprise either a fluoropolymer or PEEK, in this case both films 30, 50 are films with an adhesive layer on one side, with the adhesive surfaces bonded around the heating element 20 to formed a sealed insulating envelope around the heating element 20. In some examples the second flexible film 50 and the backing film 30 may cover differing amount of the heating element 20, for example, the backing film may extend so as to completely cover the heating element whereas the second opposing film 50 may only cover the heating area 22. However in this case, the films both cover the entirety of the heating element 20 to full enclose and insulate the heating element, with the backing films cut to near the perimeter of the heating element to provide a sealed thin film heater.

The thin film heaters 100 in FIGS. 4A and 4B also both include an additional third thin film 90 in the form of an additional heat shrink film 90. These examples therefore differ from that of FIG. 3 in that a heat shrink is not applied directly to the heating element and adhesive surface of the backing film 30 but is instead attached to the sealed envelope formed by the backing film and the second PTFE or PEEK films formed around the heater, such that the heat shrink 90 is not in contact with the heating element 20.

In the case of FIG. 4A, a heat shrink film 90 is positioned over the sealed thin film heater so as to extend beyond the area of the second film layer 50. The heat shrink can then be used to attach the thin film to the outer surface of a heating chamber. In particular, the outer surface of the backing film 30 can be wrapped around the heating chamber 60 with the heat shrink layer 90 wrapped over the outer surface of the second thin film layer 50 and attached around the outer surface of the heating chamber 60. The heat shrink film 90 and/or the thin film heater formed by the heating element sealed between the backing film 30 and second film 50 can be initially attached with pieces of adhesive tape before the assembly is heated to contract the heat shrink to secure the thin film heater.

Although in FIG. 4A, the heat shrink extends beyond the backing film 30 and second film 50 in multiple directions, in other examples of the invention the heat shrink 90 can be placed in other ways. For example, in FIG. 4B the heat shrink 90 is initially attached to an edge region of the sealed thin film heater with adhesive tape 35 so as to extend away from the sealed heating element 20. The sealed dielectric envelop 30, 50 sealing the heating element 20 is then attached at one side (next to the thermistor 70) to heating chamber so that the thermistor lies in an indentation as described above. The heating element and subsequently the heat shrink 90 are then wrapped around the heat chamber 60 such that the heat shrink overlaps the sealed heating element 20 forming an outer circumferential layer around the thin films 30, 50 and heating element 90 before heat shrinking is carried out to bond the thin film heater 100 to the chamber 60.

The heat shrink can be positioned in any manner so as to attach the heating element to the chamber 60. For example the heat shrink 90 may only overlap a top portion of the heating area 22 or it may be spirally wound around the heating chamber 60. In other examples multiple piece of heat shrink 90 are used to attach the thin film heater 100 to the heating chamber 60 for example a circumferential strip at the top of the heating element 20 and a circumferential strip at the bottom of the heating element, leaving the heater legs 23 exposed for connection to the PCB.

Figure 4C:
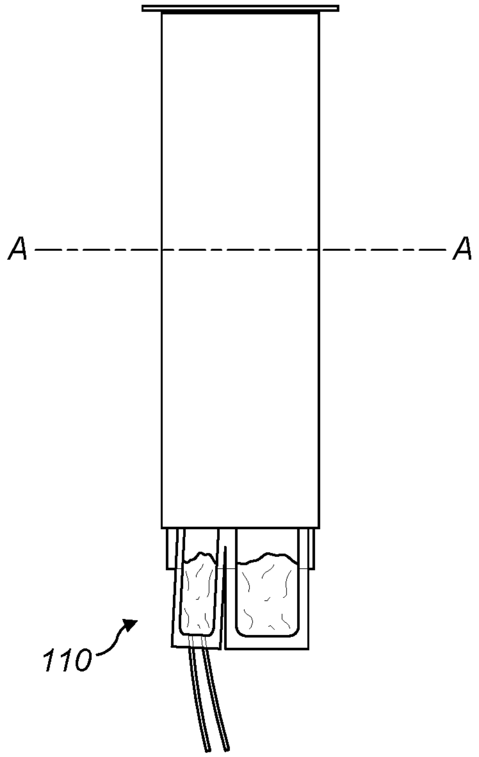
Figure 4D:
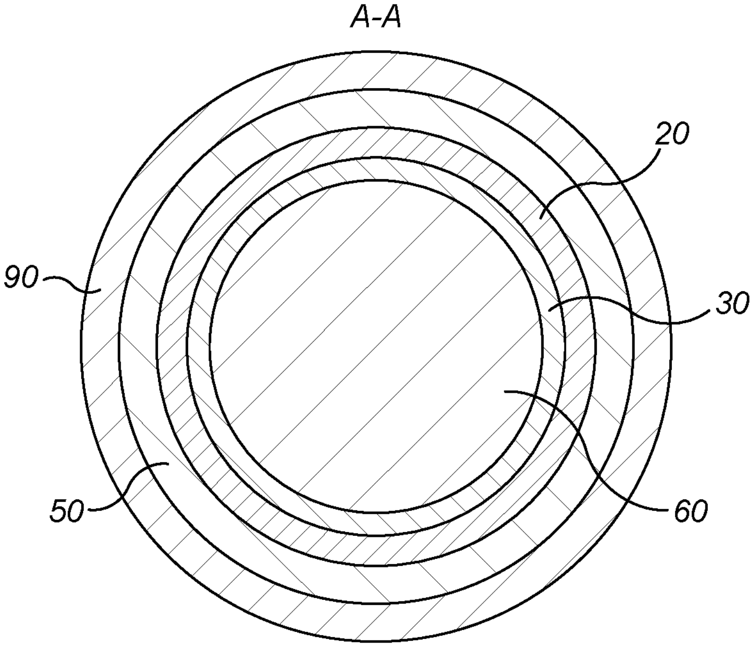

Once the thin film heater has been attached with the layer of heat shrink 90 the heater is heated to bond the thin film heater as shown in FIG. 4C. A cross section through the prepared heater assembly is shown in FIG. 4D. It can be seen that because the heating element 20 is enclosed between the backing film 30 and the second opposing film 50, the outer heat shrink 90 does not come into contact with the heating element 20.

The additional heat shrink 90 may be provided by preferential heat shrink polyimide tape 90 with the backing film 30 and opposing second film layer 50 supporting the enclosed heating element 20 provided by a fluoropolymer, such as PTFE, or by PEEK. The thicknesses and/or specific materials may be configured to optimise the heat conduction to the heating chamber 60. For example the backing film 30 may be thinner as shown in FIG. 4D to promote heat transfer to the heating chamber whereas the second film layer 50 and heat shrink 90 may be thicker to insulate the heating element 20.

Figure 5:
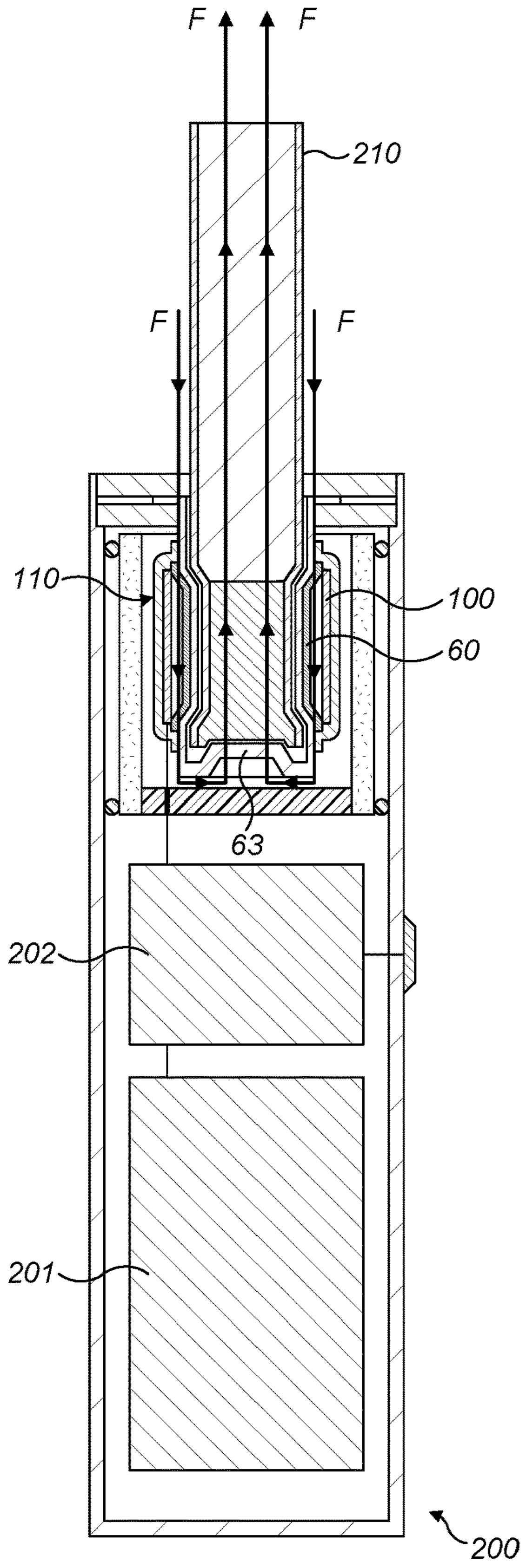
FIG. 5 illustrates an aerosol generating device according to the present invention.

A heater assembly 110 comprising a thin film heater 100 according to the present invention wrapped around the outer surface of heating chamber 60 can be used in a number of different applications. FIG. 5 shows the application of a thin film heater 100, assembled according to the method of the present invention, applied in a heat-not-burn aerosol generating device 200. Such a device 200 controllably heats an aerosol generating consumable 210 in a heating chamber 60 in order to generate a vapour for inhalation without burning the material of the consumable. FIG. 5 illustrates a consumable 210 received in the heating chamber 60 of the device 200. The heater assembly 110 of the device 200 comprises a substantially cylindrical heat conducting chamber 60 with a thin film heater 100 according to the present invention wrapped around the outer surface. The device further includes an outer sealing layer wrapped around the outer surface of the thin film heater which has a reduced thermal conductivity relative to the backing film to insulate the thin film heater. As described above, once the outer sealing layer has been attached, the assembly may be heated again, closer to the operating temperature to ensure effective outgassing has taken place.

The aerosol generating device 200 of FIG. 5 also includes a power source 201 and control circuitry 202 configured to control the supply of electrical power from the power source 201 to the thin film heater 100. The electrical power source 201 and control circuitry 202 are configured to limit the maximum temperature of the thin film heater 100 to a predefined temperature value. This predefined temperature value may be chosen dependent on the material used and may be selected from the values shown above in Table 1. In this way, the heating temperature can be limited to an optimum temperature to release vapour from the consumable 210 and maintain the backing film 30 within its working temperature range to prevent breakdown of the backing film 30. The aerosol generating device 200 is further preferably configured such that an air flow route F flows into an open end of the chamber and is drawn through the consumable 210 out of a mouth end of the consumable. In particular, the heating chamber 60 has a closed base end 63 such that air must flow into and out of the open end of the heating chamber 60. In this way, the air flow route does not pass through the housing of the device 200 and/or near the fluoropolymer backing film 30 such that, even in the case that the backing film 30 were to exceed its working temperature and potentially release unwanted by-products of the breakdown process, these would not reach the airflow route F into and out of the aerosol generating device.

With the thin film 100 according to the present invention, further alternatives for a backing film for a thin film heater are provided which are particularly suited to application in an aerosol generating device. In particular, fluoropolymers and PEEK provide good mechanical and thermal properties over a wide temperature range and provide enhanced electrically insulating properties which may reduce the thickness of the electrically insulating backing film required to ensure the heating element 20 is insulated, thereby reducing the amount of material required such that thermal transfer from the heating element to the consumable 210 is enhanced. These materials are also more resistance to tearing than conventional materials such as polyimide and therefore reduce the risk of damage during the assembly process.

As matter of example, PEEK film for the backing layer may be a Vitrex™ PEEK film having the following properties.

Density (ISO 1183): 1.3

Dielectric strength for 50 microns thickness (IEC 60243-1): 200 $kV \cdot mm^{-1}$.

The invention claimed is:

1. A thin film heater configured to be wrapped around a heating chamber of an aerosol generating device, the thin film heater comprising:

a flexible heating element;

a flexible electrically insulating backing film supporting the flexible heating element; and a flexible electrically insulating film which opposes a first surface of the flexible electrically insulating backing film to at least partially enclose the flexible heating element between the flexible electrically insulating backing film and the flexible electrically insulating film, wherein:

the flexible electrically insulating backing film comprises one or both of a fluoropolymer or Polyetheretherketone (PEEK), the thin film heater is sufficiently flexible to allow it to be wrapped into a tubular configuration, and the flexible electrically insulating film is at least approximately twice a length of the flexible electrically insulating backing film in a wrapping direction, wherein the flexible electrically insulating backing film further comprises one or more of Polytetrafluoroethylene (PTFE) Perfluoroalkoxy Polymer (PFA), Fluorinated ethylene propylene (FEP), Ethylene tetrafluoroethylene (ETFE), or Polychlorotrifluoroethylene (PCTFE or PTFCE)

wherein one side of the flexible electrically insulating backing film comprises an at least partially defluorinated surface layer.

2. The thin film heater of claim 1, further comprising an adhesive layer provided on the at least partially defluorinated surface layer.

3. The thin film heater of claim 2, wherein the flexible heating element is supported on the at least partially defluorinated surface layer of the flexible electrically insulating backing film and attached to the at least partially defluorinated surface layer with the adhesive layer.

4. The thin film heater of claim 2, wherein the adhesive layer is a silicon adhesive.

* * * * *